UNITED STATES PATENT OFFICE.

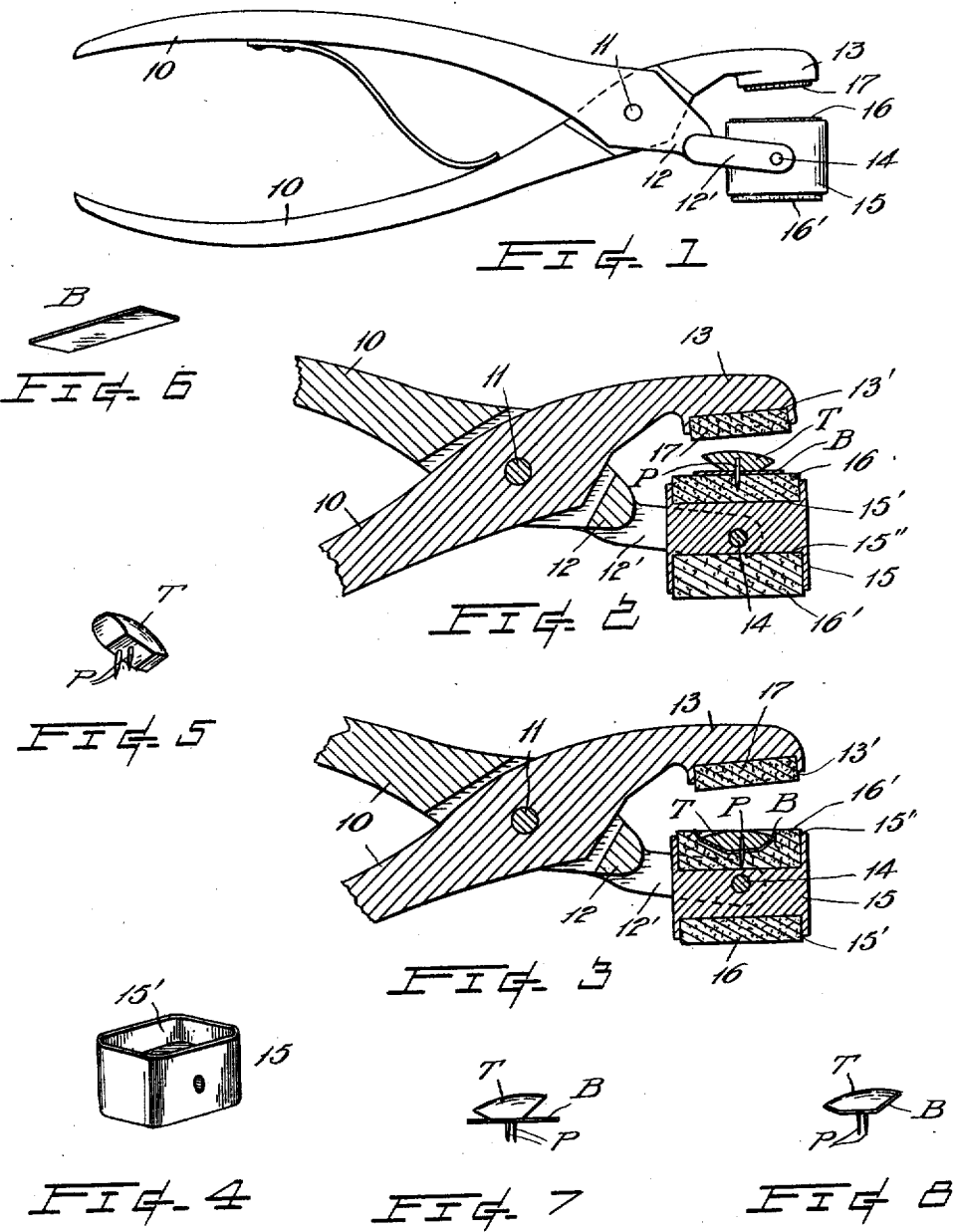

PRESTON S. WHITNEY AND ROBERT R. MYERS, OF FAIRBANKS, DISTRICT OF ALASKA.

DENTAL APPLIANCE.

No. 908,056.  Specification of Letters Patent.  Patented Dec. 29, 1908.

Application filed April 29, 1908. Serial No. 429,987.

*To all whom it may concern:*

Be it known that we, PRESTON S. WHITNEY and ROBERT R. MYERS, citizens of the United States, residing at Fairbanks, Alaska, have invented certain new and useful Improvements in Dental Appliances, of which the following is a specification, reference being had therein to the accompanying drawings.

This invention relates to dental appliances; and its object is the provision of a simple and efficient device for punching holes in the sheet metal backing of tooth-parts of porcelain or analogous material and also for swaging the backing to make the same conform to the underside of such parts.

With these ends in view the invention consists in the novel arrangement and adaptation of parts, as will be hereinafter described and claimed.

In the drawings, Figure 1 is a side elevation of devices embodying our invention; Fig. 2 is a longitudinal vertical section of a portion of the same with the block adjusted for the punching operation; and Fig. 3 is a view similar to Fig. 2 with the block reversed for swaging purposes. Fig. 4 is a perspective view of the block shown detached. Figs. 5 and 6, respectively, are perspective views of a tooth and of a blank for backing the same. Figs. 7 and 8 are side elevations of a tooth facing and connected backing therefor as produced by the punch and swage operations. In Figs. 2 and 3 the work is shown in position as completed by each of the operations for which the block is respectively set.

The reference numeral 10 designates the handles of a forceps-like implement which are fulcrumed at 11 and are provided with jaw-members 12 and 13. The member 12 is bifurcated to provide arms 12' to support a transversely arranged pin 14 upon which is tiltably mounted a box 15. This box is recessed upon two opposite sides to furnish receptacles 15' and 15'' for facings of rubber, or other suitable yielding material. The facing 16 is of a relatively hard material, such as sheet rubber employed in the manufacture of gaskets, while the other 16' is of a softer composition, such as "vulcanite". The face of the jaw 13, which opposes the block 15, is recessed to afford a cavity 13' for the reception of a relatively hard rubber facing 17 like that employed in the receptacle 15'. All of these facings are, desirably, of such depths as to extend outside of the rims of the respective cavities.

The operation of the invention may be explained as follows: A porcelain tooth T is first ground to fit a special application and the protruding ends of pins P thereof being sharpened to points or chisel edges. A backing piece of sheet metal B, such as annealed gold or platinum, large enough to cover the under side of the tooth is now laid upon the block facing 16 when the latter is opposite the jaw 13; the tooth held between the thumb and index finger of the operator's left hand is then inserted between the jaws in such manner that the tooth pins will be directed toward and be about central of the backing. By manipulating the handles 10 with the right hand the jaws are closed upon the tooth forcing the pins through the backing and into the facing under the latter. The jaws are then opened and the tooth and connected backing removed together. After reversing the block to present the facing 16' the tooth and backing are placed upon this facing and pressed by hand to insert the tooth points thereinto. A pressure now put upon the implement handles will serve to close the jaws upon the tooth and embed the tooth and its backing into this facing, as represented in Fig. 3, and thus swage the backing into intimate relation with the under side of the tooth. After removing the work the edges of the backing are trimmed and with a suitable hand tool, are burnished about the periphery.

Among the advantageous functions of this invention are the punching of the tooth pins directly into the backing, insuring a tight joint therebetween to prevent solder or flux, in after operations, from coming into contact with the porcelain part; in embedding the work in the resilient cushion the backing is affected to swage the same in to a most intimate juxtaposition with the bottom of the tooth throughout its entire surface. The employment of the rubber facings 16 and 17 furnish cushion-like supports for the work, while the other 16' yields to allow the tooth to embed therein, and thus not only serve the purpose intended and above noted but without rendering the work liable to injury.

Having described our invention, what we claim, is—

1. In apparatus of the class described, the combination with pivotally connected forceps members, a block pivotally connected to one of the jaws, said block being provided with recesses in two of its opposite sides, and facings of yielding material seated in the aforesaid recesses, substantially as and for the purposes described.

2. In apparatus of the class described, the combination, with pivotally connected forceps members having a recess formed in one of the jaws and the other jaw bifurcated, a block pivotally connected to the last named jaw, said block being provided with recesses in two of its opposite sides, and facings of yielding material seated in the several aforesaid recesses, substantially as and for the purposes described.

3. The combination with the forceps members, of a jaw formed integral with one of the forceps members, a block pivotally connected with the jaw of the other member, and facings of yielding material provided for the first named jaw and also for the opposite sides of the block, substantially as and for the purposes described.

In testimony whereof we affix our signatures in presence of two witnesses.

PRESTON S. WHITNEY.
ROBERT R. MYERS.

Witnesses:
CHAS. W. KOEGLEY,
HARRY BUKRO.